United States Patent
Moon et al.

(10) Patent No.: US 7,614,599 B2
(45) Date of Patent: Nov. 10, 2009

(54) PORTABLE CRADLE

(75) Inventors: Ji-Hyun Moon, Daegu (KR); Yang-Jic Lee, Gwacheon-si (KR); Beom-Ku Han, Gyeonggi-do (KR); Chang-Hwan Hwang, Goyang-si (KR)

(73) Assignee: Samsung Electronics (KR)

( * ) Notice: Subject to any disclaimer, the term of this patent is extended or adjusted under 35 U.S.C. 154(b) by 264 days.

(21) Appl. No.: 11/709,923

(22) Filed: Feb. 22, 2007

(65) Prior Publication Data

US 2007/0210172 A1  Sep. 13, 2007

(30) Foreign Application Priority Data

Feb. 22, 2006  (KR) ...................... 10-2006-0017370

(51) Int. Cl.
*A47G 1/24*  (2006.01)
(52) U.S. Cl. ...................... 248/454; 248/455; 248/456; 248/918
(58) Field of Classification Search ................. 248/918, 248/454, 455, 456, 457, 286.1, 166, 434
See application file for complete search history.

(56) References Cited

U.S. PATENT DOCUMENTS

| 543,658 | A | * | 7/1895 | Sigler ........................... 248/166 |
| 3,937,435 | A | * | 2/1976 | Roberts ...................... 248/464 |
| 4,978,096 | A | * | 12/1990 | Struckmann ................. 248/451 |
| 5,918,907 | A | * | 7/1999 | Ho ............................... 281/45 |
| 6,000,663 | A | * | 12/1999 | Plasse et al. ................. 248/27.8 |
| 2005/0121594 | A1 | * | 6/2005 | Kuo ........................... 248/676 |
| 2006/0108494 | A1 | * | 5/2006 | Lancet ....................... 248/456 |
| 2007/0221811 | A1 | * | 9/2007 | Hauser et al. ............... 248/454 |

* cited by examiner

*Primary Examiner*—Amy J. Sterling
(74) *Attorney, Agent, or Firm*—The Farrell Law Firm, LLP

(57) ABSTRACT

Provided is a portable cradle for a portable terminal which includes a housing; a first cradle body rotatably connected to the housing by means of a first hinge so as to be received in the housing, or of which a portion is apart from the housing and inclined; and a second cradle body rotatably connected to the housing by means of a second hinge which is spaced from the first hinge so as to be received in the housing, the second cradle body supporting the first cradle body which is inclined and adjusting an inclination angle of the first cradle body, on which the first cradle body can slide.

15 Claims, 4 Drawing Sheets

100

PORTABLE CRADLE

PRIORITY

This application claims priority under 35 U.S.C. § 119 to an application entitled "Portable Cradle" filed with the Korean Intellectual Property Office on Feb. 22, 2006 and assigned Ser. No. 2006-17370, the contents of which are incorporated herein by reference.

BACKGROUND OF THE INVENTION

1. Field of the Invention

The present invention relates generally to a portable terminal including Digital Multimedia Broadcasting Phones (DMB phone), game phones, camera phones, cellular phones, Personal Digital Assistants (PDAs), Hand Held phones and the like, and in particular, to a folding type portable cradle which can be conveniently carried along with accessories for a portable terminal.

2. Description of the Related Art

In general, a "portable terminal" refers to an electronic device which a user can conveniently carry while wirelessly communicating with another user. In consideration of portability, design of such a portable terminal has gravitated towards compactness, slimness and lightweight design, as well as towards providing multimedia capabilities for allowing the user to pursue a wider variety of functions. In particular, future portable terminals will be used for many functions while still remaining compact and light, as well as being modified to be suitable for functioning in a multimedia environment and for providing Internet access and functions.

Conventional portable terminals can be classified into various types according to their appearance, such as bar-type portable terminals, flip-type portable terminals, and folder-type portable terminals. Further, portable terminals can be classified as neckwear-type terminals and wristwear-type portable terminals, according to the position at which or the way in which a user wears the terminal. Additionally, portable terminals can be classified as rotation-type terminals and sliding-type terminals according to the manner of opening and closing the portable terminals. The various classifications of portable terminals are easily understood by those skilled in the art.

It is now common practice to watch various motion pictures through the portable terminal in a DMB mode and to enjoy entertainment, such as various games, in a multimedia environment by using the portable terminal. However, the conventional portable terminal has no separate cradle, thereby making it inconvenient to watch various motion pictures in the DMB mode when it is located on a desk, etc. Although vehicles have a separate cradle for making it possible to cradle the portable terminal, there exists no cradle, which can be used anytime, and anywhere.

Conventionally, a cradle for the portable terminal is also used as a charger. That is, a charging cradle is used for charging the portable terminal. A conventional charger charges electricity to the portable terminal which is vertically or slantingly cradled in the charger. However, since such a charger is adapted to only one type of the portable terminal, it cannot be used as a cradle for another type of the portable terminal. Additionally, the charger cannot be easily carried as an accessory in order to cradle the portable terminal. Particularly, the total size of the charger is large making it impossible to easily carry the charger as an accessory. Therefore, there is required a portable cradle which has a function of simply cradling the portable terminal.

Further, the conventional cradle has a structure in which the portable terminal can be cradled in the cradle, not in a landscape mode, but in only portrait mode. Actually, it is preferred for a user to selectively keep a display unit in a portrait mode or a landscape mode, so as to watch images displayed on a display unit.

SUMMARY OF THE INVENTION

Accordingly, the present invention has been made to solve the above-mentioned problems occurring in the conventional art, and an object of the present invention is to provide a portable cradle which has a small size, so that a user can carry like an accessory along with a portable terminal and rapidly and easily use it anytime and anywhere.

Another object of the present invention is to provide a portable cradle which allows a user to conveniently view information and various motion pictures displayed on a display unit in a DMB mode.

Still another object of the present invention is to provide a portable cradle in which a portable terminal can be cradled.

Still further another object of the present invention is to provide a portable cradle in which a portable terminal can be cradled in either portrait mode or landscape mode so that a user can conveniently use the portable terminal.

Still yet another object of the present invention is to provide a folding type portable cradle which has a simple structure and can be easy operated, so that a manufacturer can easily manufacture it and a user can conveniently carry it like an accessory.

Still another object of the present invention is to provide a portable cradle in which cradle bodies are fully contained in a housing and can be protected from impact when carrying and dropping the portable cradle.

Still further another object of the present invention is to provide a portable cradle by which an inclined angle of a portable terminal can be easily adjusted.

Still another object of the present invention is to provide a portable cradle having a cradling portion, in which a portable terminal is cradled, made of elastic material, thereby stably cradling the portable terminal with inclination.

Still another object of the present invention is to provide a portable cradle which a user can conveniently operate.

Still another object of the present invention is to provide a portable cradle which can be easily assembled and of which the manufacturing cost can be reduced.

In order to achieve these and other objects, according to an embodiment of the present invention, there is provided a portable cradle for a portable terminal which includes a housing; a first cradle body rotatably connected to the housing by means of a first hinge so as to be received in the housing, or of which a portion is apart from the housing and inclined; and a second cradle body rotatably connected to the housing by means of a second hinge which is spaced from the first hinge so as to be received in the housing, the second cradle body supporting the first cradle body which is inclined and adjusting an inclination angle of the first cradle body, on which the first cradle body can slide.

In order to achieve these and other objects, according to another embodiment of the present invention, there is provided a portable cradle for a portable terminal which includes a housing; a first cradle body rotatably connected to the housing by means of a first hinge so as to be received in the housing, or of which a portion is apart from the housing and inclined; a second cradle body rotatably connected to the housing by means of a second hinge which is spaced from the first hinge so as to be received in the housing, the second cradle body supporting the first cradle body which is inclined and adjusting an inclination angle of the first cradle body, on which the first cradle body can slide; a holding unit mounted on the first cradle body and located at a front portion of the housing when the first cradle body is rotated, for stably holding the portable terminal; a pair of guide units mounted on the second cradle body, for stably guiding a sliding of the first cradle body; and angle adjusting units arranged between the guide units, for adjusting an inclined angle of the first cradle body.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
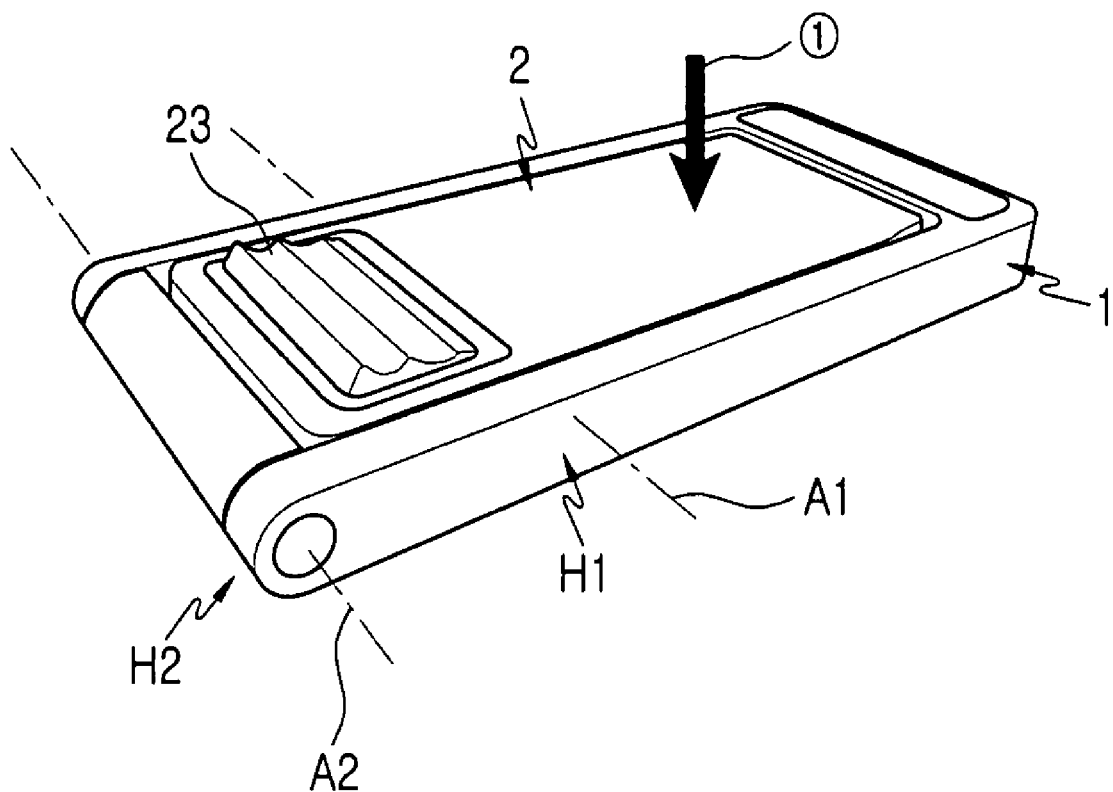
FIG. 1 is a perspective view illustrating a folded portable cradle according to the present invention.

Hereinafter, the preferred embodiment of the present invention will be described in detail with reference to the annexed drawings. In the drawings, the same or similar elements are denoted by the same reference numerals though they are depicted in different drawings. In the following description of the present invention, a detailed description of known functions and configurations incorporated herein is omitted for clarity and conciseness.

As shown in FIGS. 1 to 4, a cradle 100 for a portable terminal according to the present invention is a portable and foldable device, i.e. an accessory having a smaller size than that of the portable terminal and can be easily carried along with the portable terminal. Specifically, the cradle 100 according to the present invention is a device capable of providing the most suitable multimedia environment to the portable terminal in the future, especially providing convenience to a user in a DMB mode or TV mode. The cradle 100 according to the present invention includes a housing 1, and first and second cradle bodies 2 and 3 which are received in the housing 1 and which rotate to be spaced far apart or to approach each other.

The housing 1 can have an open space for receiving either a portion or all of the first and second cradle bodies 2 and 3 respectively. Further, the housing 1 has two hinges, i.e. first and second hinges H1 and H2, in which the first hinge H1 is disposed in the housing 1 and is rotatably connected to the first cradle body 3 and the second hinge H2 is disposed in the housing 1 and rotatably connected to the second cradle body 3. The first and second hinges H1 and H2 are spaced apart, which provide first and second hinge axes A1 and A2, which are parallel to each other, to the first and second cradle bodies 2 and 3, respectively.

Figure 2:
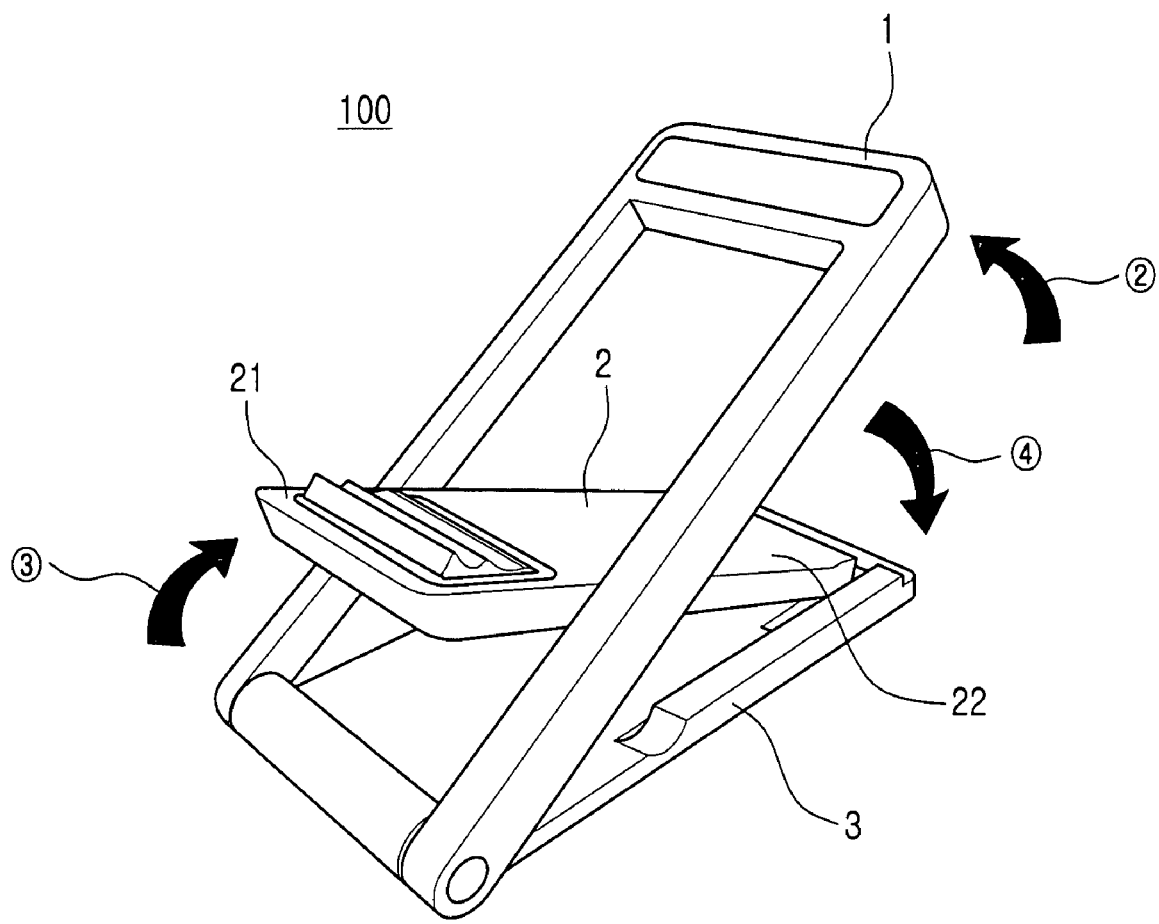
FIGS. 2 and 3 are perspective views illustrating the portable cradle according to the present invention, in which two bodies are sequentially rotated and remain in a cradling state.
Figure 3:
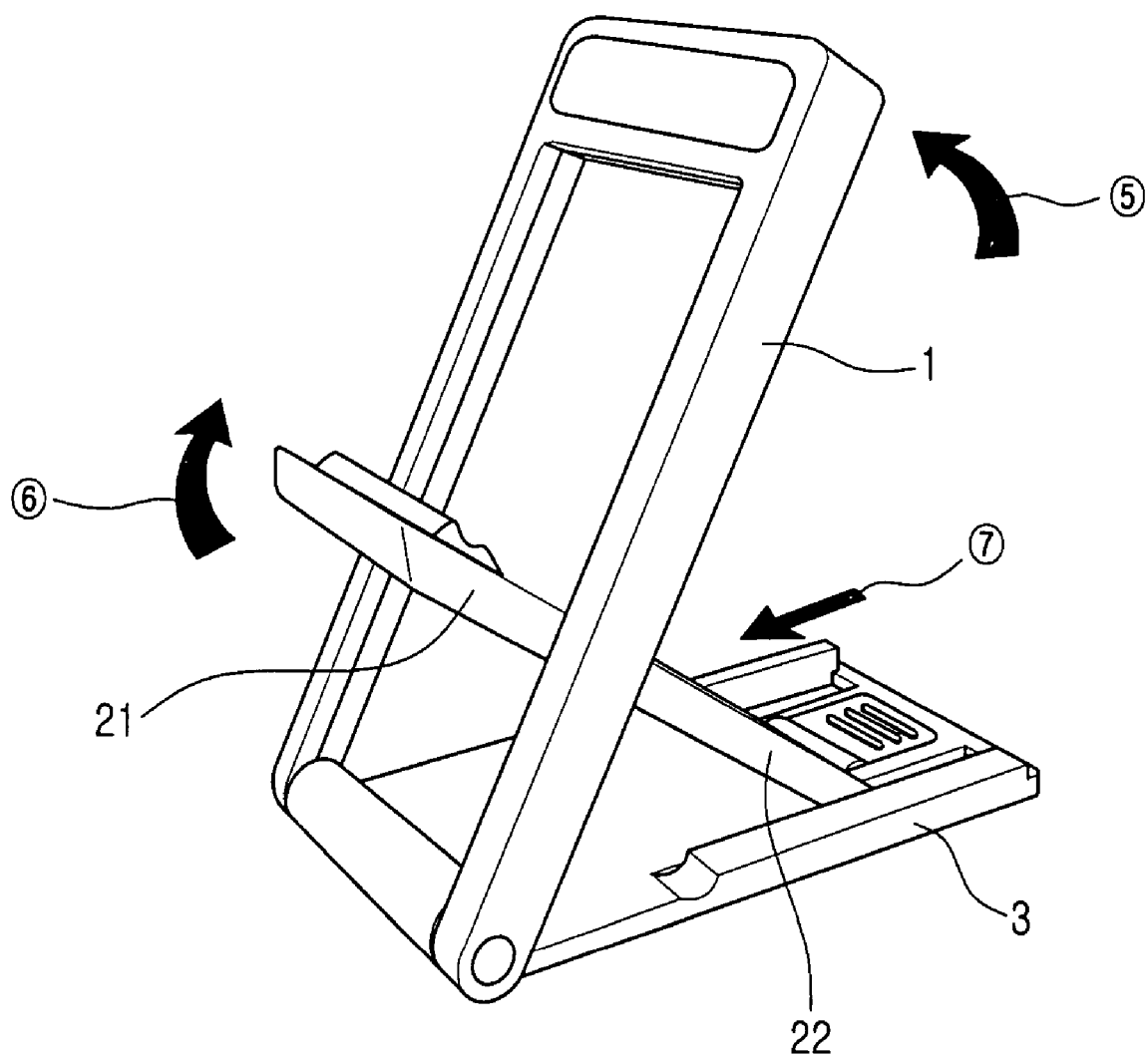
Figure 4:
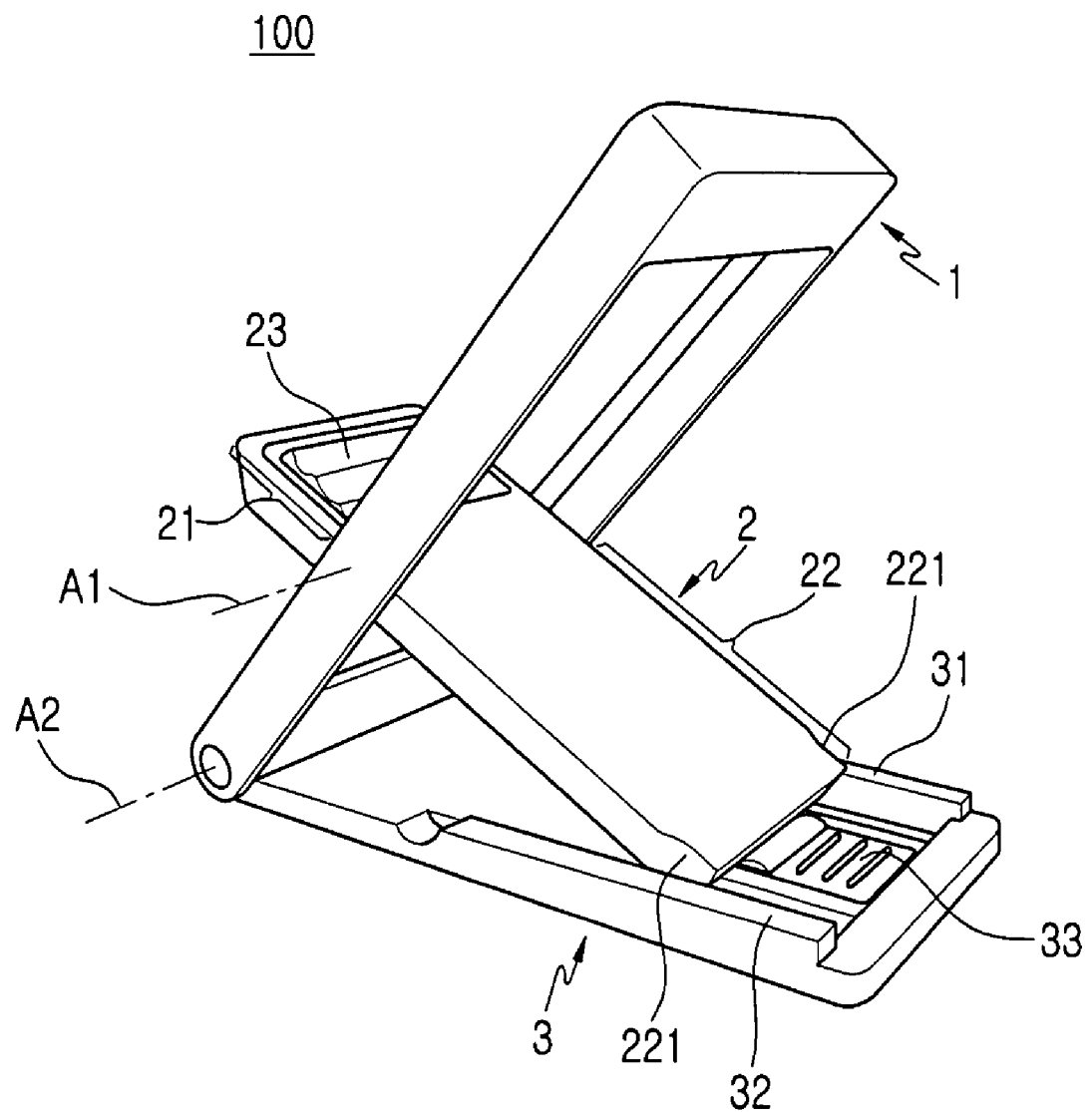
FIG. 4 is a perspective view illustrating the portable cradle by which a portable terminal is supported, according to the present invention, in which the cradle is viewed from a rear portion thereof.

The first cradle body 2 is fully received in the housing 1, or separated from the housing 1 so as to support the cradled portable terminal along with the housing 1, according to the rotation thereof. Specifically, the first cradle body 2 is separated from the housing 1 so as to be inclined relative to the ground surface. FIG. 1 shows the first cradle body 2 fully received in the housing 1, while FIGS. 2 to 4 show the first cradle body 2 in a rotated state and separated from the housing 1. The housing 1 serves to receive all of the first and second cradle bodies 2 and 3 so as to protect them from the exterior circumstance. The first cradle body 2 is rotatable by a predetermined angle so as to be inclined to support the portable terminal.

Specifically, the first cradle body 2 has a plate shape, which can be separated into two portions, such as a cradling portion 21 and a supporting portion 22. The cradling portion 21 is located at the front portion of the housing 1 after the first cradle body 2 rotates by the predetermined angle. A supporting portion 22 is located at the rear portion of the housing 1 so as to support the second cradle body 3.

The cradling portion 21 includes a holding unit 23 which stably holds the portable terminal placed on the upper surface of the first cradle body 2 thereof. Specifically, the holding unit 23 is located on the upper surface of the first cradle body 2, so as to be located at the front portion of the housing 1 or to be received in the housing 1. The holding unit 23 extends parallel to the first hinge axis A1 of the first hinge H1. The holding unit 21 is always exposed to the exterior, regardless of the rotation of the first cradle body 2.

Further, the holding unit 23 is located at the front portion of the housing 1 when the first cradle body 2 rotates, so as to stably hold the portable terminal cradled therein. Preferably, the holding unit 23 has a plurality of protrusion and depression portions. The protrusion and depression portions 23 include alternately arranged protrusion portions and depression portions. The protrusion and depression portions 23 have a wave like shape having greater height and depth at the front portion than those at the rear portion of the first cradle body 2. The height and depth of the protrusion and depression portions 23 decrease less and less from the front portion to the rear portion of the first cradle body 2. This is in order to positively cope with the inclination of the first cradle body 2. Further, the holding unit 23 is made of an elastic material, in order to stably support the portable terminal placed thereon. Preferably, the elastic material includes a rubber and a synthetic resin material such as silicon material or urethane material.

The second cradle body 3 may be fully received in the housing 1 or exit from the housing 1 by means of the second hinge H2, so as to be supported against the ground surface. Further, the second cradle body 3 supports the first cradle body 2 which is inclined, so as to allow the end of the supporting portion 23 of the first cradle body 2 to slide along the second cradle body 3. Accordingly, the inclination of the first cradle body 2 can be adjusted. The second cradle body 3 is further provided with guide units 31 and 32 for a stable sliding of the first cradle body 2, and members 33 used for adjusting the inclined angle of the first cradle body 2.

The guide units 31 and 32 include a pair of guiding bars, which are arranged at the rear portion of the second cradle body 3. Further, the guide units 31 and 32 linearly protrude at the rear portion on the upper surface of the second cradle body 3, so as to stabilize the sliding movement of the first cradle body 2.

The members 33 used for adjusting the inclined angle are arranged between the guide units 31 and 32, so as to support the first cradle body 2 in order to maintain the inclination of the first cradle body 2.

Referring to FIGS. 1 to 3, the rotation movement of the first and second cradle bodies 2 and 3 will now be described. In the state shown in FIG. 1, when a user pushes the supporting portion 22 of the first cradle body 2 in a direction marked by an arrow ①, the housing 1 rotates and ascends in a direction marked by an arrow ②, the cradling portion 21 of the first cradle body 2 rotates in a direction marked by an arrow ③, and the second cradle body 3 and the supporting portion 22 (as shown in FIGS. 2 and 4) of the first cradle body 2 descends in a direction marked by an arrow ④, as shown in FIG. 2. These movements are simultaneously performed.

Next, in the state shown in FIG. 2, if the user intends to make the first cradle body 2 more inclined, the user rotates and lifts the housing 1 in a direction marked by an arrow ⑤. At the same time, the cradling portion 21 (as shown in FIGS. 2 and 4) is further rotated in a direction marked by an arrow ⑥ while the rear end of the second cradle body 3 is linearly moved in a direction marked by an arrow ⑦.

Specifically, with the rotation movement of the first cradle body 2, the cradling portion 21 of the first cradle body 2 in the initial state of facing the second cradle body 3 is rotated in a direction of being apart from the second hinge H2 so as to be located at the front portion of the housing 1. Further, the supporting portion 22 of the first cradle body 2 in the initial state of facing the second cradle body 3 is rotated in a direction of being apart from the housing 1 so as to be located at the rear portion of the housing 1. On the other hand, with the rotation movement of the second cradle body 3, the second cradle body 3 in the initial state of facing the first cradle body 2 is rotated in a direction of being apart from the first hinge H1 so as to be located at the rear portion of the housing 1. Relatively, the housing 1 in the state of facing the first and second cradle bodies 2 and 3 is rotated in a direction of being apart from the second cradle body 3, so that the cradling portion 21 of the first cradle body 2 gradually protrudes in the front portion of the housing 1 at the same time when the housing 1 rotates, and the supporting portion 22 moves apart from the housing 1 more and more.

The first cradle body 2 is provided with a pair of protrusion 221 which is formed at the rear end of the first cradle body 2, so as to smoothly slide between the guide units 31 and 32.

Further, the portable cradle according to the present invention can be made of light synthetic resin so as to have various colorful appearances, and used as a fashionable accessory when a user carries it along with a portable terminal.

According to the present invention as described above, a user can easily carry the portable cradle like an accessory, along with the portable terminal, so as to conveniently use it anytime and anywhere. Further, the portable cradle according to the present invention has a plurality of protrusion and depression portions, so as to rigidly support the portable terminal. Further, it is possible to make the portable cradle thin and to miniaturize it. In addition, the portable cradle makes it possible to adjust an inclination angle of the portable terminal as well as to selectively cradle the portable terminal in a portrait or landscape mode. Furthermore, the portable cradle according to the present invention has a simple structure in which it is folded, so that a manufacturer can easily manufacture the portable cradle. In consideration of users, it is easy to operate the portable cradle and it is possible to cradle all kinds of portable terminals in the portable cradle. Further, the present invention has an advantage in that the cradle bodies can be fully received and protected in and by the housing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable cradle for a portable terminal, comprising:
   a housing;
   a first cradle body having a plate shape and being rotatably connected to the housing by means of a first hinge so as to be received in the housing, a portion of which maybe inclined and apart from the housing, the first cradle body holding the portable terminal placed on an upper surface of the first cradle body; and
   a second cradle body rotatably connected to the housing by means of a second hinge which is spaced apart from the first hinge so as to be received in the housing, the second cradle body supporting the first cradle body which is inclined and adjusting an inclination angle of the first cradle body, on which the first cradle body can slide.

2. The portable cradle for a portable terminal as claimed in claim 1, wherein the first cradle body includes a cradling portion which is rotated by a predetermined angle so as to be located at a front portion of the housing; and a supporting portion which is located at a rear portion and supported by the second cradle body, of which a sliding movement is controlled by the second cradle body.

3. The portable cradle for a portable terminal as claimed in claim 2, wherein the cradle portion further includes a holding means for holding the portable terminal placed on the cradling portion, which extends parallel with a hinge axis of the first hinge.

4. The portable cradle for a portable terminal as claimed in claim 3, wherein the holding means is always exposed to an exterior regardless of the rotation of the first cradle body.

5. The portable cradle for a portable terminal as claimed in claim 3, wherein the holding means includes a plurality of protrusion and depression portions having a wave like shape, the protrusion and depression portions being disposed between an outer end and an inner end of the holding means, the inner end adjacent to the first hinge and opposite the outer end.

6. The portable cradle for a portable terminal as claimed in claim 5, wherein the protrusion and depression portions have greater height and depth at the outer end than those at the inner end.

7. The portable cradle for a portable terminal as claimed in claim 1, wherein the second cradle body further includes a guide means for stably guiding a sliding of the first cradle body, wherein the guide means includes a pair of guide bars located at a rear portion of the second cradle body.

8. A portable cradle for a portable terminal, comprising:
   a housing;
   a first cradle body rotatably connected to the housing by means of a first hinge so as to be received in the housing, a portion of which maybe apart from the housing and inclined;
   a second cradle body rotatably connected to the housing by means of a second hinge which is spaced from the first hinge so as to be received in the housing, the second cradle body supporting the first cradle body which is inclined and adjusting an inclination angle of the first cradle body, on which the first cradle body can slide;
   a holding unit mounted on the first cradle body and located at a front portion of the housing when the first cradle body is rotated, for stably holding the portable terminal;
   a pair of guide units mounted on the second cradle body, for stably guiding a sliding of the first cradle body; and
   angle adjusting units arranged between the guide units, for adjusting an inclined angle of the first cradle body.

9. The portable cradle as claimed in claim 8, wherein the holding unit is located at a front portion on an upper surface of the first cradle.

10. The portable cradle as claimed in claim 8, wherein the pair of guide units protrudes on a rear portion of an upper surface of the second cradle body.

11. The portable cradle as claimed in claim 8, wherein the housing is opened at upper and lower ends of the housing so as to fully receive the second cradle body.

12. The portable cradle as claimed in claim 8, wherein the holding unit is made of elastic material.

13. The portable cradle as claimed in claim 8, wherein the first cradle body is provided with a pair of protrusions and depression portions at a rear end of the first cradle body.

14. The portable cradle as claimed in claim 8, wherein the first cradle body is rotated so that a front portion of the first cradle body, when in a state of initially facing the second cradle body, moves so as to be apart from the second hinge and located at a front portion of the housing, while a rear portion of the first cradle body, in the state of initially facing the second cradle body, moves so as to be apart from the housing and located at a rear portion of the housing.

15. The portable cradle as claimed in claim 8, wherein the second cradle body in a state of initially facing the first cradle body is rotated in a direction of being apart from the first hinge and located at a rear portion of the housing.

* * * * *